(12) United States Patent
Murata et al.

(10) Patent No.: US 11,648,878 B2
(45) Date of Patent: May 16, 2023

(54) DISPLAY SYSTEM AND DISPLAY METHOD

(71) Applicant: MAXELL, LTD., Kyoto (JP)

(72) Inventors: Seiji Murata, Tokyo (JP); Hiromitsu Mori, Tokyo (JP); Kenichi Shimada, Tokyo (JP); Kazuyoshi Yamazaki, Tokyo (JP); Mayumi Nagayoshi, Tokyo (JP)

(73) Assignee: MAXELL, LTD., Kyoto (JP)

(*) Notice: Subject to any disclaimer, the term of this patent is extended or adjusted under 35 U.S.C. 154(b) by 138 days.

(21) Appl. No.: 16/648,780

(22) PCT Filed: Sep. 22, 2017

(86) PCT No.: PCT/JP2017/034202
§ 371 (c)(1),
(2) Date: Mar. 19, 2020

(87) PCT Pub. No.: WO2019/058492
PCT Pub. Date: Mar. 28, 2019

(65) Prior Publication Data
US 2020/0285884 A1 Sep. 10, 2020

(51) Int. Cl.
*G06V 10/40* (2022.01)
*B60R 1/00* (2022.01)
*G06F 3/01* (2006.01)
*G06V 10/60* (2022.01)
(Continued)

(52) U.S. Cl.
CPC ............ *G06V 10/40* (2022.01); *B60R 1/00* (2013.01); *G06F 3/013* (2013.01); *G06V 10/60* (2022.01);
(Continued)

(58) Field of Classification Search
CPC ........ G06V 20/56; G06V 20/58; G06V 10/40; G06V 20/597; G06V 20/59; G06V 10/60;
(Continued)

(56) References Cited

U.S. PATENT DOCUMENTS

| | | | |
|---|---|---|---|
| 2003/0095080 A1* | 5/2003 | Colmenarez | G06T 5/002 345/7 |
| 2003/0123752 A1* | 7/2003 | Ishii | G06T 5/40 382/286 |

(Continued)

FOREIGN PATENT DOCUMENTS

| | | | | |
|---|---|---|---|---|
| DE | 102017115318 A1 * | 1/2018 | | B60R 1/00 |
| JP | 2003-199094 A | 7/2003 | | |

(Continued)

OTHER PUBLICATIONS

International Search Report of PCT/JP2017/034202 dated Nov. 7, 2017.

*Primary Examiner* — Nizar N Sivji
(74) *Attorney, Agent, or Firm* — Mattingly & Malur, PC

(57) ABSTRACT

A luminance determining unit 14 determines a luminance distribution of an exterior circumstantial image in a line-of-sight direction of a driver 300, and a luminance changing unit 15 determines a bright region 301 of this luminance distribution. Further, the luminance changing unit 15 determines a luminance after the change in a peripheral region 302 of this bright region 301. A virtual-image creating unit 16A creates a virtual image based on the determined luminance, and a display processing unit 17 displays this virtual image on a display unit 200. In this manner, since a display system 1A displays the virtual image for use in increasing the luminance in periphery of the bright region 301, the feeling of the brightness for the driver 300 can be moderated, and therefore, the visual recognition can be improved. That is, the display system 1A can output the virtual image depending on the circumstances.

6 Claims, 11 Drawing Sheets

(51) Int. Cl.
   *G06V 20/20* (2022.01)
   *G06V 20/59* (2022.01)
   *G06V 20/58* (2022.01)
(52) U.S. Cl.
   CPC ............ *G06V 20/20* (2022.01); *G06V 20/582* (2022.01); *G06V 20/584* (2022.01); *G06V 20/59* (2022.01); *B60K 2370/1529* (2019.05); *B60K 2370/177* (2019.05); *B60R 2300/10* (2013.01); *B60R 2300/20* (2013.01); *G06V 2201/07* (2022.01)
(58) Field of Classification Search
   CPC .... G06V 20/20; G06V 20/582; G06V 20/584; G06V 2201/07; G06V 40/18; B60R 2300/205; B60R 2300/105; B60R 2300/30; B60R 2300/607; B60R 2300/802; B60R 2300/8066; B60R 2300/301; B60R 2300/8093; B60R 2300/307; B60R 1/00; B60R 2300/10; B60R 2300/20; G06F 3/011; G06F 3/147; G06F 3/017; G06F 3/1431; G06F 3/005; G06F 3/013; G06F 3/012; B60K 2370/334; B60K 2370/31; B60K 2370/179; B60K 2370/21; B60K 2370/77; B60K 2370/167; B60K 2370/1868; B60K 2370/52; B60K 37/04; B60K 2370/1529; B60K 2370/177; B60K 2370/349; B60K 35/00; G06T 19/006; G06T 2200/24; G06T 2207/20112; G06T 7/70; G06T 2207/30252; G06T 2210/61; G06T 19/00
   See application file for complete search history.

(56) References Cited

U.S. PATENT DOCUMENTS

| | | | |
|---|---|---|---|
| 2009/0102858 A1 | 4/2009 | Eggers et al. | |
| 2012/0320212 A1* | 12/2012 | Aimura | G01C 21/3602 348/148 |
| 2013/0293582 A1* | 11/2013 | Ng-Thow-Hing | G01C 21/365 345/633 |
| 2015/0210217 A1* | 7/2015 | Taylor | B60R 1/00 367/87 |
| 2017/0084056 A1* | 3/2017 | Masuya | G09F 21/049 |
| 2017/0155867 A1* | 6/2017 | Yokota | H04N 5/44504 |
| 2017/0282813 A1* | 10/2017 | Hashimoto | G08G 1/166 |
| 2017/0309257 A1* | 10/2017 | Akita | B60K 35/00 |
| 2018/0024354 A1* | 1/2018 | Shibata | B60W 30/12 345/7 |
| 2018/0218711 A1* | 8/2018 | Suzuki | G09G 5/10 |

FOREIGN PATENT DOCUMENTS

| | | | | |
|---|---|---|---|---|
| JP | 2004-302903 A | | 10/2004 | |
| JP | 2004302903 A | * | 10/2004 | |
| JP | 2005-509984 A | | 4/2005 | |
| JP | 2009-143470 A | | 7/2009 | |
| JP | 2009-530695 A | | 8/2009 | |
| JP | 2010-066042 A | | 3/2010 | |
| JP | 2015-523624 A | | 8/2015 | |
| JP | 2016-070716 A | | 5/2016 | |
| JP | 2015523624 A | * | 1/2017 | |
| WO | WO-2017002209 A1 | * | 1/2017 | ............ B60K 35/00 |
| WO | WO-2017113403 A1 | * | 7/2017 | ............ B60R 1/00 |

* cited by examiner

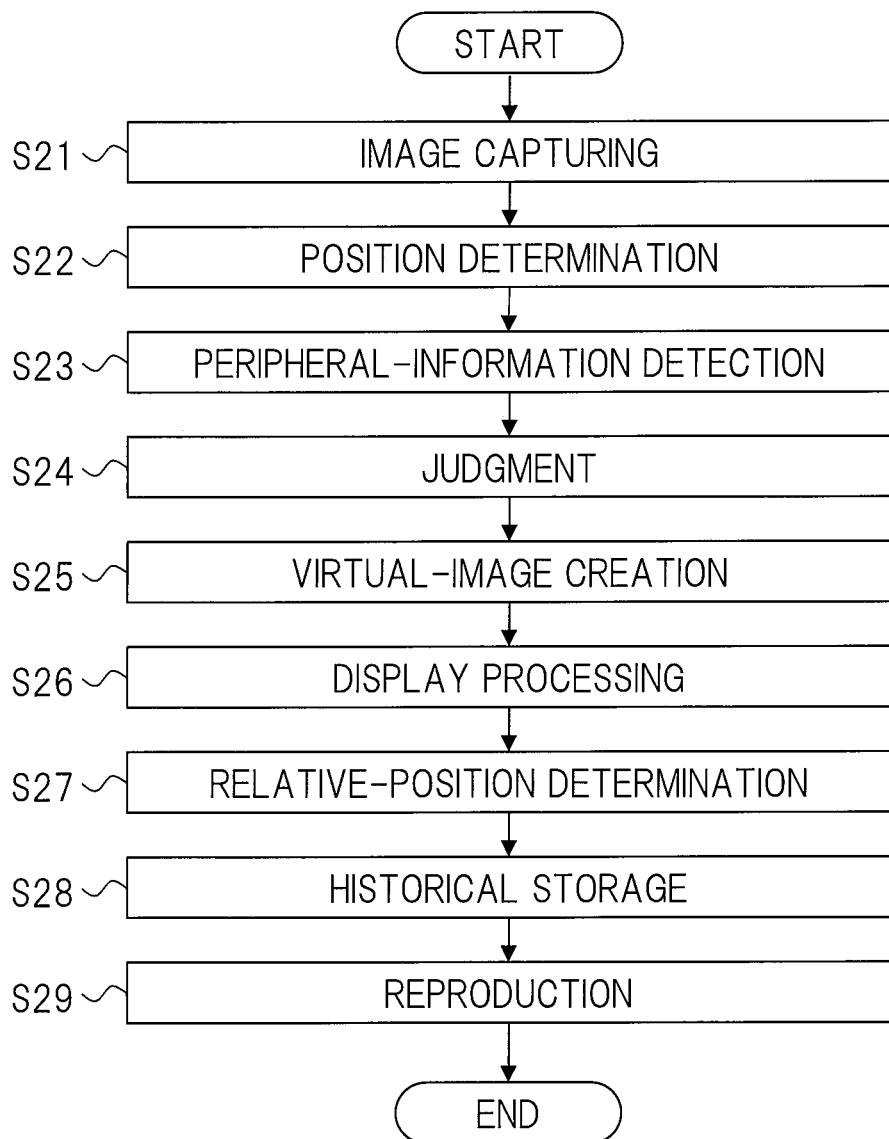

DISPLAY SYSTEM AND DISPLAY METHOD

TECHNICAL FIELD

The present invention relates to a display system and a display method.

BACKGROUND ART

An object of the present invention is to reduce movement of a line of sight to support safety driving of a car, and each of AR (Augmented Reality) display apparatuses (AR-HUD) that displays forward scenery for a driver and car device information (of indicators, car navigation information, alert, warning and others) so as to overlap on a windshield glass or a combiner (at a position of a sun visor or above a dashboard) has been commercialized.

Technical examples of the AR display apparatuses include a technique that displays an image having an improved driving scene for the driver when a practical image that is looked at by the driver deteriorate due to weather (see, for example, a Patent Document 1). More specifically, an image of a camera that captures the driving scene is acquired, and a quality of the camera image that deteriorates due to bad weather is improved by noise filtering and is output.

RELATED ART DOCUMENT

Patent Document

Patent Document 1: Japanese Patent Application Laid-Open Publication (Translation of PCT Application) No. 2005-509984

SUMMARY OF THE INVENTION

Problems to be Solved by the Invention

In the technique disclosed in the Patent Document 1, the quality of the camera image is stereotypically improved. However, a virtual (AR) image can be more suitable to be displayed when a display processing is performed in accordance with peripheral circumstances of a movable body (such as a vehicle).

An object of the present invention is to provide a display system and a display method of outputting a virtual image in accordance with peripheral circumstances of a movable body.

The above and other objects and novel characteristics of the present invention will be apparent from the description of the present specification and the accompanying drawings.

Means for Solving the Problems

As means for overcoming the issues, a technique described in claims is used.

As one example to be cited, a display system that displays a virtual image on a display unit mounted on a movable body includes: an image capturing unit capturing an image of a forward part of the movable body through the display unit; a position determining unit determining a position of the movable body; a target determining unit determining an emphasis target to be displayed on the display unit on the basis of the position determined by the position determining unit; a luminance determining unit determining a luminance of the image captured by the image capturing unit; a virtual-image creating unit creating a virtual image for use in emphasizing the emphatic target determined by the target determining unit, on the basis of the luminance determined by the luminance determining unit; and a display processing unit displaying the virtual image created by the virtual-image creating unit, on the display unit.

Effects of the Invention

A virtual image can be output in accordance with peripheral circumstances of a movable body by using a technique of the present invention.

BRIEF DESCRIPTIONS OF THE DRAWINGS

FIG. 11 is a flowchart showing a procedure of a display processing for the virtual image based on vehicle peripheral information.

BEST MODE FOR CARRYING OUT THE INVENTION

Examples of embodiments of the present invention will be described below with reference to the drawings.

(Hardware Configuration of Display System)

Figure 1:
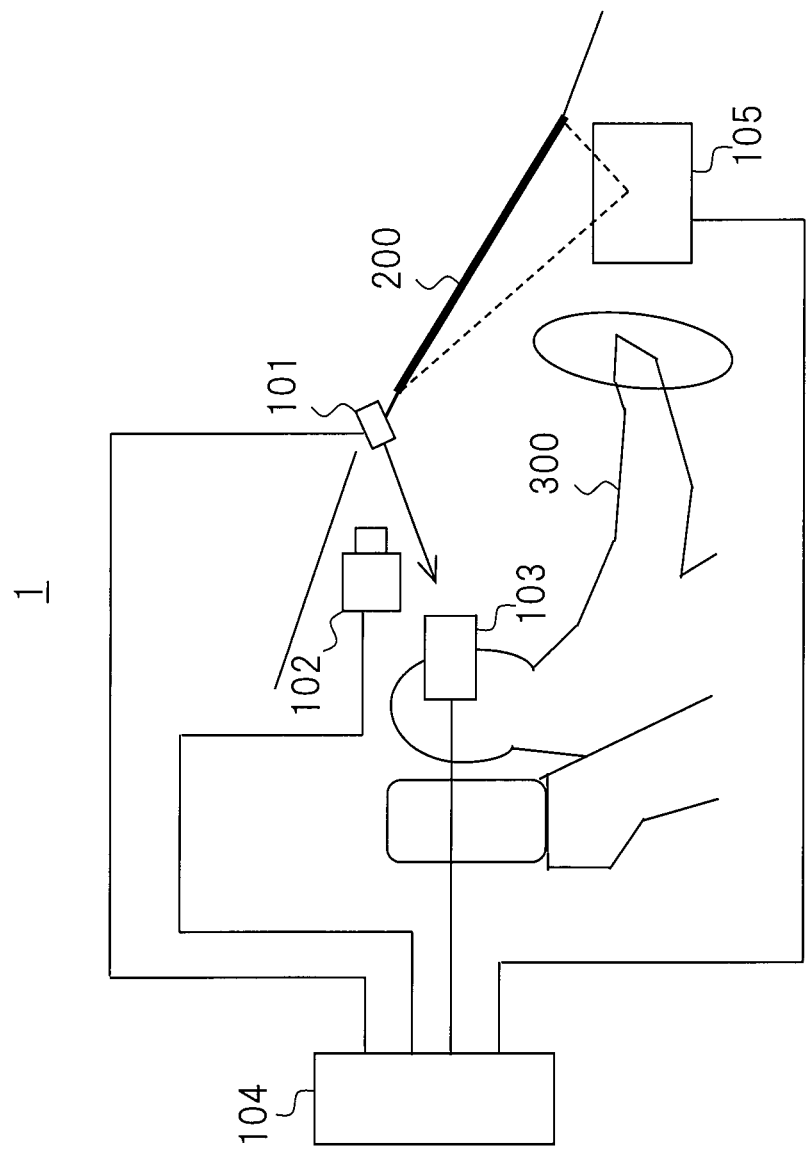
FIG. 1 is a diagram showing an outline of a hardware configuration of a display system 1.

First, with reference to FIG. 1, an outline of a hardware configuration of a display system 1 (display systems 1A to 1C) will be described. FIG. 1 is a diagram showing the outline of the hardware configuration of the display system 1 in a driver seat of a vehicle. The display system 1 is a system mounted on a movable body such as a vehicle. This display system 1 creates a virtual image (AR information) in accordance with peripheral circumstances of the movable body, and displays the created virtual image onto a display unit 200 (a windshield glass or a combiner) mounted on the movable body.

As shown in FIG. 1, the display system 1 includes a head tracking device 101, an exterior-circumstantial-image capturing unit 102, a wearable camera 103, an image controlling device 104, and an image displaying device 105. The display system 1 also includes a GPS (Global Positioning System) receiver or others not illustrated.

The head tracking device 101 is a device that detects head position and orientation of a driver 300 (a user of the display system 1) to detect a line of sight of the driver 300. The head tracking device 101 is fixed to the driver seat. The head tracking device 101 transmits a detection result to the image controlling device 104. The exterior-circumstantial-image capturing unit 102 is a means for capturing an image of outside of the vehicle (a forward part of the vehicle) through the display unit 200. To the image controlling device 104, the exterior-circumstantial-image capturing unit 102 transmits an image that has been acquired as a result of the image capturing. The exterior-circumstantial-image capturing unit 102 is, for example, a monocular camera made of one camera lens and one light-receiving element not illustrated. As another mode, the exterior-circumstantial-image capturing unit 102 may be, for example, a stereo camera made of two camera lenses and two light-receiving elements not illustrated. The exterior-circumstantial-image capturing unit 102 is fixed to the driver seat.

The wearable camera 103 is an image-capturing means attached to the driver 300. The wearable camera 103 is a means for capturing an image of a forward part of the driver 300. Since the wearable camera 103 is attached to the driver 300, an image on the line of sight of the driver 300 can be acquired. To the image controlling device 104, the wearable camera 103 transmits an image that has been acquired as a result of the image capturing.

The image controlling device 104 is a device that creates the virtual image in accordance with the peripheral circumstances. The image controlling device 104 is an information processing device including a CPU (Central Processing Unit), a ROM (Read Only Memory), a RAM (Random Access Memory) and others. The image controlling device 104 acquires a line-of-sight detection result of the driver 300 from the head tracking device 101. Also, the image controlling device 104 acquires an image from the exterior-circumstantial-image capturing unit 102 and the wearable camera 103. Moreover, the image controlling device 104 acquires a GPS signal from the GPS receiver. The image controlling device 104 can perform publicly-known image analysis. The image controlling device 104 creates the virtual image to be displayed, on the basis of the acquired image, GPS signal, line-of-sight detection result of the user, and others. The image controlling device 104 transmits the created virtual image to the image displaying device 105.

The image controlling device 104 stores the acquired image, and stores the created virtual image. The image controlling device 104 transmits the created virtual image to the image displaying device 105. The image controlling device 104 reproduces the stored image and virtual image in response to assignment of the user. The image controlling device 104 has a function of storing map information and performing navigation using the GPS signal.

The image displaying device 105 is a projecting device made of a light source (an LED or a laser), a lens, a mirror and an optical element such as an SLM (Spatial Light Modulator), a MEMS mirror or a DMD, and is, for example, a head-up display (HUD). The image projected from this image displaying device 105 is projected on the driver 300 as an image having a predetermined magnification percentage and existing at a predetermined position of the display unit 200. Not the head-up display but, for example, a see-through type head mounted display (HMD) can be also used. When this display is used, for example, vibration of the vehicle is detected from information of an acceleration sensor provided in the HMD, and an image projected on a display of the HMD is vibrated to cancel the vibration of the vehicle as much as possible so that the user does not feel uncomfortable.

The display system 1 includes a driver's state monitor no illustrated. This driver's state monitor detects a pupil size of the driver 300 and eye reaction (motion and line of sight) of the same. This driver's state monitor is a publicly-known device, and is, for example, a device that captures an image of the driver.

First Working Example

Subsequently, a first working example will be described. The display system 1A of the present working example changes a peripheral luminance of bright light entering eyes of the driver 300, and controls display so that the bright light is difficult to be noticed.

Figure 2:
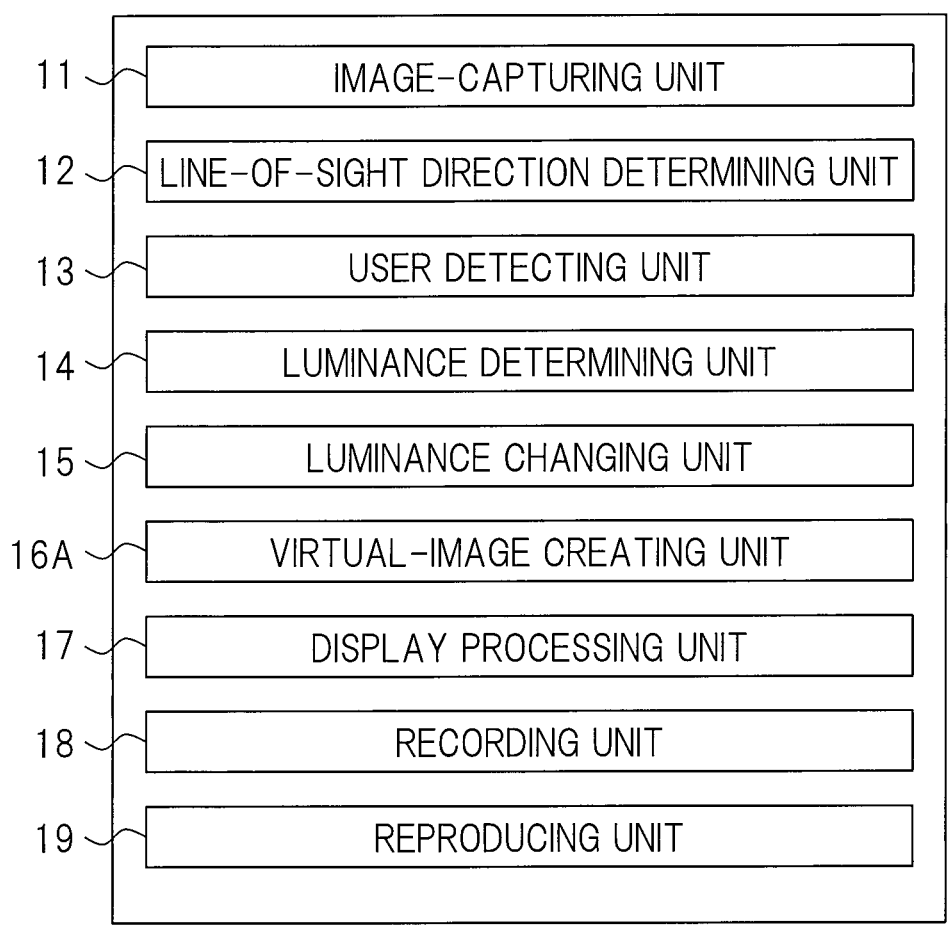
FIG. 2 is a functional block diagram of a display system of a first working example.

Subsequently, with reference to FIG. 2, a function of the display system 1A of the first working example will be described. FIG. 2 is a functional block diagram of the display system 1A of the first working example. The display system 1A includes an image capturing unit 11, a line-of-sight direction determining unit 12, a user detecting unit 13, a luminance determining unit 14, a luminance changing unit 15, a virtual-image creating unit 16A, a display processing unit 17, a recording unit 18 and a reproducing unit 19.

The image capturing unit 11 is a unit that captures the image of the forward part of the vehicle. This image capturing unit 11 is achieved by the exterior-circumstantial-image capturing unit 102. To the luminance determining unit 14 and the recording unit 18, the image capturing unit 11 transmits an image as a result of the capturing of the image of the forward part of the vehicle.

Note that the image capturing unit 11 may be achieved by not only the exterior-circumstantial-image capturing unit 102 but also the wearable camera 103. In this case, the image capturing unit 11 transmits an image (user image) captured by the wearable camera 103 to the recording unit 18. That is, the image capturing unit 11 also functions as a user-image capturing unit.

The line-of-sight direction determining unit 12 is a unit that determines a line-of-sight direction of the driver 300. The line-of-sight direction determining unit 12 is achieved by the head tracking device 101. To the luminance determining unit 14 and the recording unit 18, the line-of-sight direction determining unit 12 transmits information indicating the determined line-of-sight direction.

The user detecting unit 13 is a unit that detects a user's eye state. The user detecting unit 13 is achieved by the above-described driver monitor. The user detecting unit 13 transmits the user's eye state to the luminance changing unit 15.

The luminance determining unit 14 is a unit that determines a luminance of the image captured by the image capturing unit 11, the luminance being in the line-of-sight direction determined by the line-of-sight direction determining unit 12. The luminance determining unit 14 is achieved by the image controlling device 104. The luminance determining unit 14 acquires an image from the image capturing unit 11, and determines a luminance value of this image by analyzing this image.

The luminance determining unit 14 acquires information indicating the line-of-sight direction from the line-of-sight direction determining unit 12, and determines the line-of-sight direction and a luminance in periphery of the line-of-sight direction on the basis of the information indicating the line-of-sight direction and an analysis result of the image. For example, the luminance determining unit 14 acquires a two-dimensional luminance distribution as the analysis result. To the luminance changing unit 15, the luminance determining unit 14 transmits information indicating the determined luminance. Note that the luminance determining unit 14 may determine the luminance distribution of the entire image, regardless of the line-of-sight direction.

The luminance changing unit 15 is a unit that changes the luminance so as to increase the luminance in periphery of the line-of-sight direction on the basis of the luminance determined by the luminance determining unit 14 and the luminance in periphery of the line-of-sight direction. The luminance changing unit 15 is achieved by the image controlling device 104.

The luminance changing unit 15 acquires the information indicating the luminance from the luminance determining unit 14. Also, the luminance changing unit 15 acquires the information indicating the line-of-sight direction that has been detected from line-of-sight direction determining unit 12. Further, the luminance changing unit 15 acquires the information indicating the eye state of the user (driver) from the user detecting unit 13. The luminance changing unit 15 determines a bright portion for the driver 300 by using the acquired information, and changes the luminance in periphery of this portion.

Figure 3:
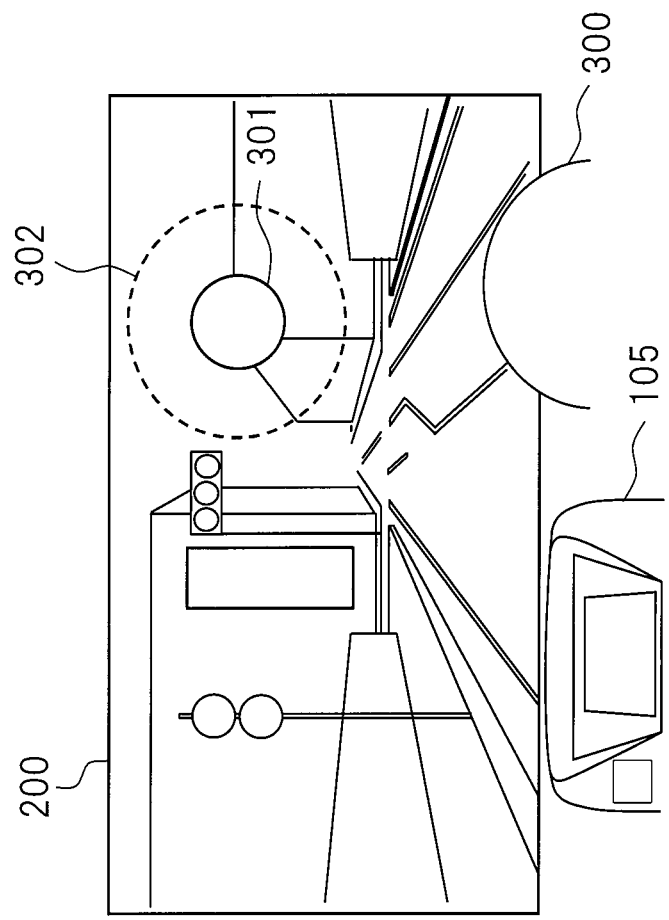
FIG. 3 is a diagram (1) showing exterior circumstances that can be looked at by a driver.

Here, with reference to FIG. 3, the portion to be changed in the luminance will be described. FIG. 3 is a diagram showing exterior circumstances that can be looked at by the driver 300. The driver 300 can look at the exterior circumstances through the display unit 200. Here, there is a bright region 301 (such as the sun on west side) beyond the line of sight of the driver 300. On the basis of the information indicating the user's eye state (such as the pupil size) output from the user detecting unit 13, the luminance changing unit 15 judges whether the driver 300 feels the brightness. When determining that the driver 300 feels the brightness, the luminance changing unit 15 determines the bright region 301 by determining a portion beyond the line of sight of the driver 300 on the basis of the information indicating the line-of-sight direction.

Note that the luminance changing unit 15 may determine the bright region 301 without using the information indicating the user's eye state output from the use detecting unit 13. For example, the luminance changing unit 15 may acquire the luminance distribution from the luminance determining unit 14, refer to this luminance distribution, and determine a region having an absolute value of a predetermined luminance or more as the bright region 301.

The predetermined luminance is desirable to be within a range that the driver 300 can directly look at, and may be determined to be, for example, about 20000 cd/m$^2$ that is around a surface brightness of a fluorescent lamp. The luminance changing unit 15 may two-dimensionally calculate a spatial luminance change amount of the acquired luminance distribution, and determine a brighter region (bright region 301) while assuming a portion having a large luminance change amount as a boundary.

The luminance changing unit 15 determines a luminance acquired after the change so as to gradually increase a luminance of a peripheral region 302. Note that the peripheral region 302 may be previously determined or be changed in accordance with a size of the bright region 301. For example, the peripheral region may have an area that is twice an area of the bright region 301.

Figure 4:
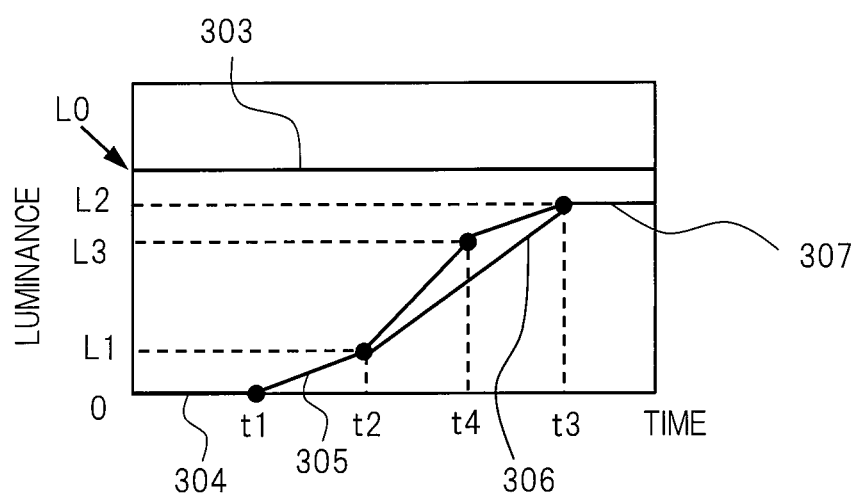
FIG. 4 is a graph showing change of a luminance of a peripheral region.

Here, an example of the change of the luminance of the peripheral region 302 by the luminance changing unit 15 on the basis of the luminance of the bright region 301 will be described with reference to FIG. 4. FIG. 4 is a graph showing the change of the luminance of the peripheral region 302. A vertical axis represents the luminance, and a horizontal axis represents time. The luminance of the bright region 301 is shown by a line segment 303 (having a certain luminance value "L0"). The luminance changing unit 15 gradually increases the luminance of the peripheral region 302 with respect to the time as shown by a line segment 304 (having a luminance 0 until time "t1"), a line segment 305 on which the luminance changes to a luminance "L1" (from the time "t1" to time "t2"), a line segment 306 on which the luminance changes to a luminance "L2" (from the time "t2" to time "t3") and a line segment 307 on which the luminance is maintained at the luminance "L2" (after the time "t3").

The driver 300 generally feels the brightness when a spatial luminance contrast is large. Here, the luminance L2 is a threshold at which the driver 300 does not feel the brightness. A relation of "Luminance L0>Luminance L2>Luminance L1>0" is established. When a luminance change per time "L1/(t2−t1)" is set to be smaller than "(L2−L1)/(t3−t2)", the peripheral region 302 is gradually brightened, and thus, can be observed to be naturally brightened, so that uncomfortableness of the driver 300 due to rapid luminance change can be avoided.

As another method, a luminance "L3" having a relation of "Luminance L1>Luminance L3>Luminance L2" is provided. If "L1/(t2−t1)<(L3−L1)/(t4−t2)" is set while a relation of "(L2−L3)/(t3−t4)<(L3−L1)/(t4−t2)" is set by using the time "t4" as time for which the luminance reaches the luminance L3, when the luminance is increased from L1 to L2, time taken from t1 to t2 can be lengthened. As a result, it is more suppressed to make the driver 300 aware of start of the luminance change than the above-described method, and therefore, the luminance increase not making the driver feel the uncomfortableness is achieved.

The luminance changing unit 15 may determine the luminance of the luminance region inside the peripheral region 302 so as to cause gradation from the bright region 301 to outside of the peripheral region 302 equalizing to luminance gradation from the luminance of the bright region 301 to a luminance of a portion outside the peripheral region 302. This configuration can reduce the spatial changing amount of the luminance, and therefore, the brightness for the driver 300 can be reduced. Also, in order to achieve the luminance distribution, as the luminance value after the change, the luminance changing unit 15 may use the luminance distribution determined by the luminance determining unit 14 to determine a value acquired by subtracting a luminance distribution of the peripheral region 302 from a luminance distribution to be provided to the driver 300.

However, in any processing, when the region is too bright because of a high luminance L0, the luminance changing unit 15 may not adjust the luminance of the peripheral region 302 without performing such a processing as causing the peripheral luminance to follow the brightness. For example, a luminance of the sun in fine weather is about $1.7 \times 10^9$ cd/m$^2$. If the luminance is controlled so as to follow the reflection of the sun on a glass or others, the bright region 301 is expanded. In order to prevent this expansion, if the luminance is determined so as not to add the adjustment for the luminance increase when the luminance becomes a luminance having a predetermined second absolute value such as 100000 cd/m$^2$ or larger, the expansion of the bright region 301 for the driver 300 can be prevented.

A processing in a case of the luminance change of the bright region 301 during any processing described above will be described. The luminance changing unit 15 resets the luminances L1 to L3 that are the luminances for use in the processing, and performs the processing again. When a position of a largest luminance region 107 has changed, the bright region 301 and the peripheral region 302 to be targets are determined again. By such control, a field of view having the suppressed brightness can be always effectively provided to the driver 300.

When the brightness sufficiently reduces so as not to make the driver 300 feel the brightness because of the luminance change of the bright region 301, the luminance is returned. It is desirable to allow the luminance changing unit 15 to change the luminance so as to temporally fades away in order not to rapidly change the circumstances that are visually recognized by the driver 300.

The luminance changing unit 15 transmits the changed luminance value and a change-target region (information indicating a size of the region and a position of the region) to the virtual-image creating unit 16.

The virtual-image creating unit 16 is a unit that creates the virtual image based on the luminance changed by the luminance changing unit 15. The virtual-image creating unit 16 is achieved by the image controlling device 104. The virtual-image creating unit 16 acquires the changed luminance value and the change-target region from the luminance changing unit 15. The virtual-image creating unit 16 creates a virtual image having the size of the region and the changed luminance value acquired from the luminance changing unit 15. The virtual-image creating unit 16 transmits the created virtual image and the information indicating the position of the region to the display processing unit 17 and the recording unit 18.

The display processing unit 17 is a unit that allows the display unit 200 to display the virtual image that has been created by the virtual-image creating unit 16. The display processing unit 17 is achieved by the image display device 105. The display processing unit 17 acquires the virtual image and the information indicating the position of the region from the virtual-image creating unit 16. The display processing unit 17 displays the acquired virtual image at a portion corresponding to the position of the region.

The recording unit 18 is a unit that stores the image that has been captured by the image capturing unit 11 and the virtual image that has been created by the virtual-image creating unit 16. The recording unit 18 is a unit that determines a relative-positional information based on the orientation of the user (driver 300) of the display system 1 and the image-capturing direction of the image capturing unit 11, and stores this relative-positional information. That is, the recording unit 18 functions as a relative-positional-information determining unit and a historical-information storing unit. The recording unit 18 is achieved by the image controlling device 104.

The recording unit 18 acquires an image (an exterior circumstantial image, a user image) from the image capturing unit 11, and acquires the virtual image that has been created by the virtual-image creating unit 16. The recording unit 18 acquires information indicating the line-of-sight direction from the line-of-sight direction determining unit 12. The recording unit 18 determines the relative-positional information by using the previously-stored directional information of the image capturing unit 11 and the information indicating the line-of-sight direction. This relative-positional information is angle information that is determined by the direction of the image capturing unit 11 (the image-capturing direction of the image capturing unit 11) and the line-of-sight direction.

The recording unit 18 stores separately stores the image acquired from the image capturing unit 11 and the virtual image created by the virtual-image creating unit 16 into a storing means (such as a hard disk) as the historical information. The recording unit 18 stores the relative-positional information as the historical information so as to separate from the image and the virtual image.

Instead of separately storing the exterior circumstantial image, the relative-positional information and the virtual image, note that the recording unit 18 may create a synthesis image that is acquired by synthesizing the virtual image with the image (the exterior circumstantial image) acquired from the image capturing unit 11 on the basis of the relative-positional information, and store this synthesis image into the storing means.

The reproducing unit 19 is a unit that reproduces the synthesis image that is acquired by synthesizing the virtual image with the image captured by the image capturing unit 11 on the basis of the relative-positional information by using the information stored in the recording unit 18. When receiving a reproduction request from the user of the display system 1, the reproducing unit 19 acquires the exterior circumstantial image stored in the recording unit 18, and reproduces this exterior circumstantial image on a display (such as a display of a navigation system). When there is the virtual image corresponding to the exterior circumstantial image, the reproducing unit 19 acquires this virtual image and the relative-positional information from the recording unit 18, synthesizes this exterior circumstantial image with the virtual image on the basis of the relative-positional information, and reproduces the synthesized image.

When the synthesis image is stored, the reproducing unit 19 may reproduce the synthesis image without performing the synthesis processing. The reproducing unit 19 may further reproduce the user image stored in the recording unit 18.

Figure 5:
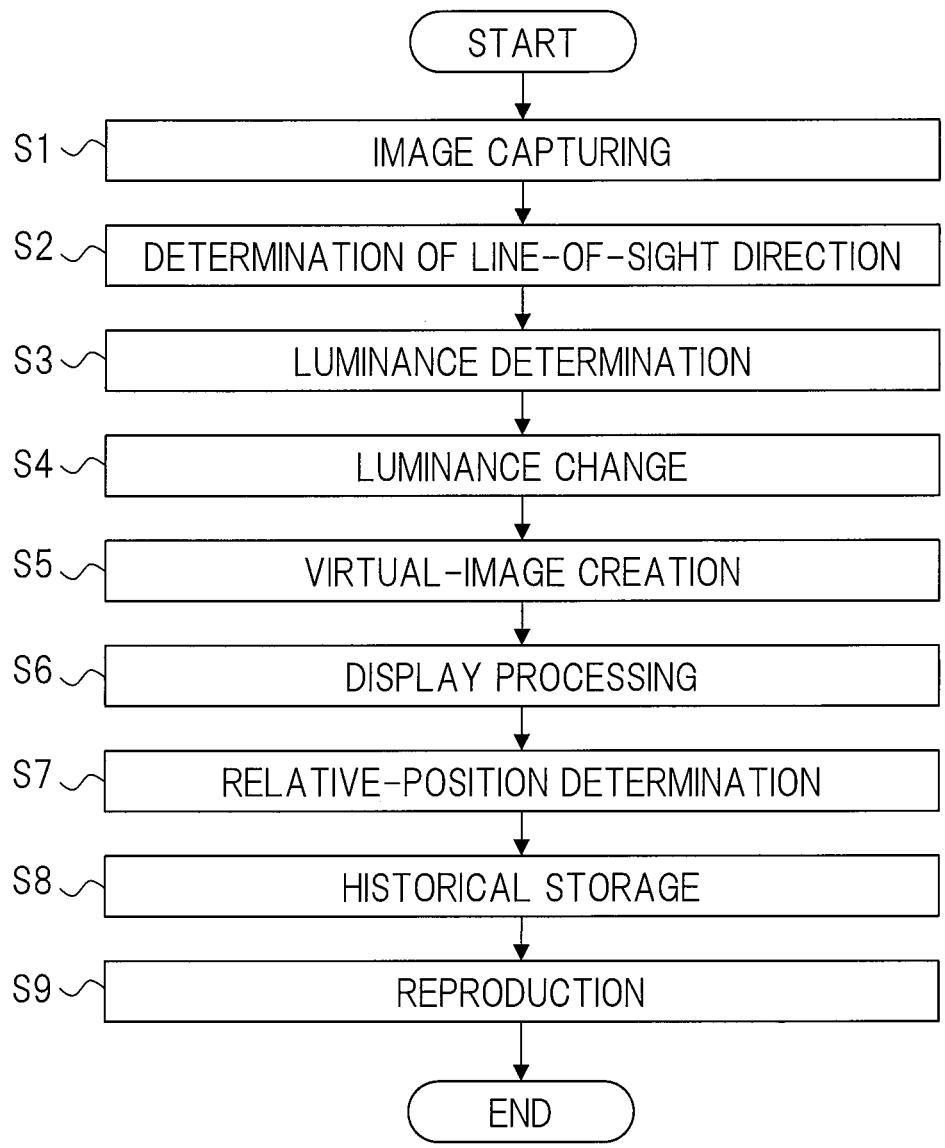
FIG. 5 is a flowchart showing a procedure of a display processing with adjustment of the luminance performed by the display system.

Subsequently, with referenced to FIG. 5, a procedure of the display processing with the luminance adjustment will be described. FIG. 5 is a flowchart showing a procedure of the display processing with the luminance adjustment performed by the display system 1A. First, the image capturing unit 11 captures the exterior circumstantial image (in a step S1). The line-of-sight direction determining unit 12 determines the line of sight of the driver 300 (in a step S2). Note that the step S1 and the step S2 may be in reverse order, or may be performed in parallel.

Subsequently, the luminance determining unit 14 determines the luminance of the exterior circumstantial image captured by the image capturing unit 11, and creates the luminance distribution (in a step 3). The luminance changing unit 15 determines the bright region 301 by using the luminance distribution on the basis of the line-of-sight direction of the user and the user state. Further, the luminance changing unit 15 determines the luminance of the peripheral region 302 after the change (in a step S4).

The virtual-image creating unit 16 creates the virtual image based on the luminance after the change and the peripheral region 302 (in a step S5). On the display unit 200, the display processing unit 17 displays the virtual image that has been created by the virtual-image creating unit 16 (in a step S6).

The recording unit 18 determines the relative-positional information based on the orientation of the driver 300 (the line-of-sight direction) and the image-capturing direction of the image capturing unit 11 (in a step S7). The recording unit 18 stores the image that has been captured by the image capturing unit 11, the relative-positional information and the virtual image as the historical information (in a step S8). The reproducing unit 19 reproduces the synthesis image that has been acquired by synthesizing the virtual image with the exterior circumstantial image on the basis of the relative-positional information (in a step S9).

As described above, the luminance determining unit 14 determines the luminance distribution of the exterior circumstantial image in the line-of-sight direction of the driver 300, and the luminance changing unit 15 determines the bright region 301 in this luminance distribution. Further, the luminance changing unit 15 determines the luminance after the change in the peripheral region 302 of this bright region 301. The virtual-image creating unit 16A creates the virtual image based on the determined luminance, and the display processing unit 17 displays this virtual image on the display unit 200. In this manner, since the display system 1A displays the virtual image for use in the increase of the luminance in periphery of the bright region 301, the feeling of the brightness for the driver 300 can be moderated, and therefore, the visual recognition can be improved. That is, the display system 1 can output the virtual image depending on the peripheral circumstances.

The user's eye state is detected by the user detecting unit 13, and then, the luminance changing unit 15 changes the luminance of the peripheral region 302 on the basis of this user's eye state, and therefore, the luminance can be changed in consideration of difference among the users in a luminance making each user feel bright.

The recording unit 18 stores the relative-positional information, the exterior circumstantial image that has been captured by the image capturing unit 11 and the virtual image that has been created by the virtual-image creating unit 16, as the historical information. Then, the reproducing unit 19 reproduces the image that has been acquired by synthesizing the virtual image with the exterior circumstantial image. As described above, the display system 1A can reproduce a display state of the virtual image information in past driving. In this manner, it can be checked whether the virtual image information has been suitably displayed. For example, when a car accident or others has occurred, the user of the display system 1A can verify whether the accident has occurred due to the display of the virtual image. That is, since the recording unit 18 stores the historical information, this manner can leave a proof for use in determining which one of the driver 300 and the display system has responsibility for the car accident.

The recording unit 18 separately stores the exterior circumstantial image that has been captured by the image capturing unit 11 and the virtual image that has been created by the virtual-image creating unit 16. In this manner, in the display system 1A, a data amount for use in the recording can be reduced more than that in a recording case with the exterior circumstantial image and the virtual image overlapping each other.

The recording unit 18 stores the user image of the driver 300, and the reproducing unit 19 reproduces this user image, and therefore, the display state of the virtual image at a user's point of view can be checked.

Although not described above, the display system 1A may perform a control so as to delete the virtual image on the basis of a driving route of the vehicle, after the display of the virtual image. For example, when the vehicle reaches a location where a current driving direction changes, the display system 1A may delete the virtual image on the basis of a driving route searched by a navigation function. For example, if the virtual image is continuously displayed when the light of the sun on the west side enters the vehicle from a front side, the virtual image is undesirably displayed in spite of the change of the driving direction of the vehicle to cause no entry of the light of the sun on the west side. By the deletion of the virtual image when the driving direction changes as described above, the virtual image is avoided from being continuously displayed in spite of the state in which the driver 300 does not feel the brightness.

In the above-described working example, it has been described that the line-of-sight direction determining unit 12 is achieved by the head tracking device 101. In place of this, an eye tracking device for use in detecting the line-of-sight direction of the driver 300 may be used. In this case, the line of sight is directly detected by using an orientation of eyeballs of the driver 300, a position of the same or others, and therefore, detection accuracy can be increased.

In the above-described working example, the case of causing the recording unit 18 to record the exterior circumstantial image that has been captured by the image capturing unit 11 and the user image has been described. However, only the user image may be recorded. In this case, the reproducing unit 19 can reproduce the image of the point of view of the driver 300. Although the case of causing the recording unit 18 to record the exterior circumstantial image that has been captured by the image capturing unit 11 and the user image has been described, only the exterior circumstantial image may be recorded. In this case, the reproducing unit 19 can reproduce the exterior circumstantial image and the virtual image that has been synthesized with this exterior circumstantial image.

As a modification example of the present working example, the display unit 200 may be set between the driver 300 and the windshield glass, and a combiner having a liquid crystal shutter may be used. In this case, the luminance of the bright light can be lowered through the combiner, so that the brightness entering the eyes of the driver 300 can be prevented.

As a modification example of the present working example, the windshield glass may have a function of cutting light having brightness that is equal to or higher than a threshold when the light enters.

Second Working Example

Figure 6:
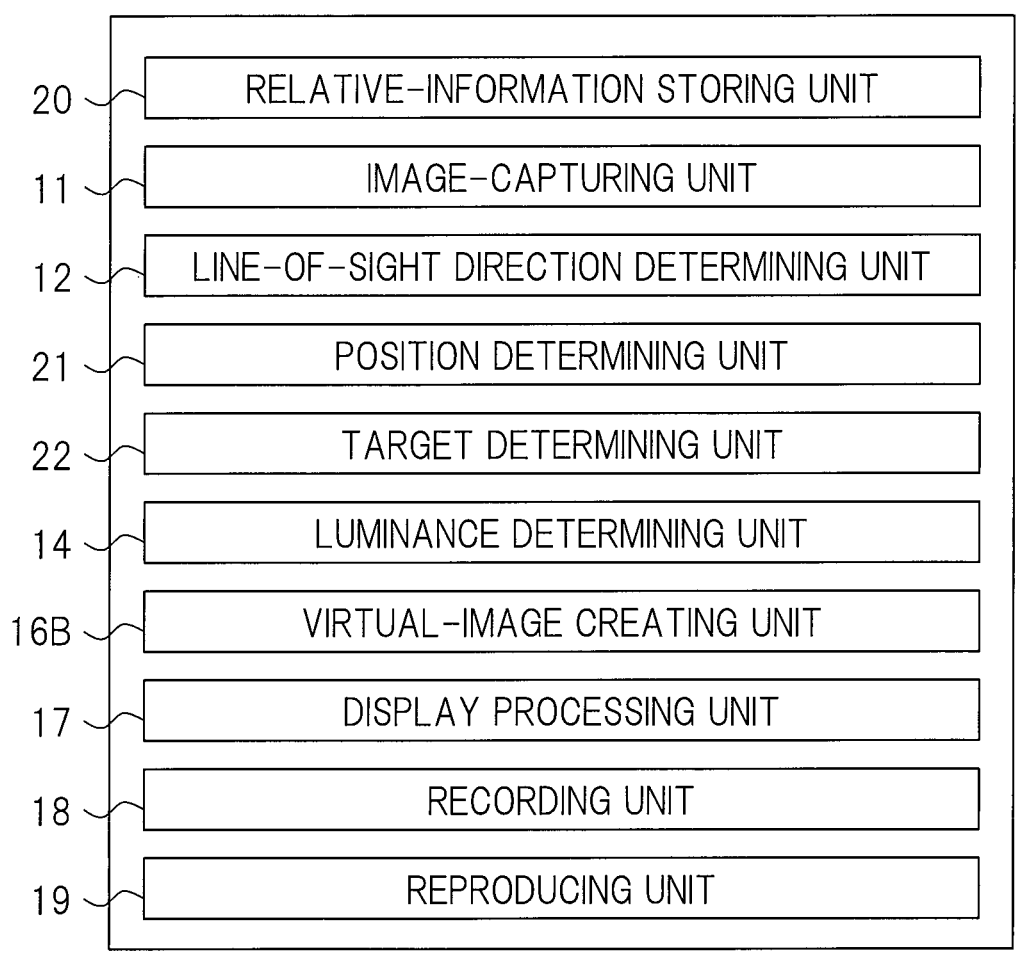
FIG. 6 is a diagram showing an outline of a configuration example of a display system according to a second working example.

FIG. 6 is a diagram showing an outline of a configuration example of a display system 1B according to a second working example. The display system 1B is a system that displays a virtual image so that an emphasis target (attentive-look target) on a forward part of the vehicle is easier to be looked at by the driver 300.

The display system 1B includes a link-information storing unit 20, an image capturing unit 11, a line-of-sight direction determining unit 12, a position determining unit 21, a target determining unit 22, a luminance determining unit 14, a virtual-image creating unit 16B, a display processing unit 17, a recording unit 18 and a reproducing unit 19.

The link-information storing unit 20 is a unit that stores link information linking signboard letters that are letters displayed on a signboard to a simplified symbol of these signboard letters. The link-information storing unit 20 is achieved by the image controlling device 104.

The position determining unit 21 is a unit that determines a position of the vehicle. The position determining unit 21 is achieved by the image controlling device 104. The position determining unit 21 receives a GPS signal, and determines the position of the vehicle by using the received GPS signal and previously-stored map information. To the target determining unit 22, the position determining unit 21 transmits information indicating the determined position.

The target determining unit 22 is a unit that determines the emphasis target displayed on the display unit 200, on the basis of the position that is determined by the position determining unit 21. The target determining unit 22 is achieved by the image controlling device 104. Here, the emphasis target is a target that is to be attentively looked at by the driver 300. In the present working example, the emphasis target is a traffic signal, a traffic sign, a signboard or others.

When acquiring the information indicating the position from the position determining unit 21, the target determining unit 22 also determines the driving direction on the basis of a directional sensor, and determines the emphasis target on the forward part of the vehicle in the driving on the basis of this position and the driving direction. Specifically, with reference to the previously-stored map information, the target determining unit 22 acquires information indicating a map object (the traffic signal, the traffic sign, a facility or others) on the forward part of the vehicle in the driving.

When the acquired map-object information contains the map object attached with the information indicating the emphasis target, the target determining unit 22 determines this map object as the emphasis target. The map-object information includes information of a map object type (the traffic signal, the traffic sign or others), information of a map object position, information indicating whether the map object is the emphasis target, a name shown on a signboard of a facility when the type of the map-object information is the facility, and an image of this map object (an image of the signboard in the case of the facility). The target determining unit 22 transmits the determined map-object information to the virtual-image creating unit 16B.

The virtual-image creating unit 16B is a unit that creates the virtual image for use in emphasizing the map object that has been determined by the target determining unit 22, on the basis of the luminance that has been determined by the luminance determining unit 14. The virtual-image creating unit 16B acquires the map-object information from the target determining unit 22. When the luminance distribution that has been determined by the luminance determining unit 14 has a region having a luminance that is equal to or higher than a predetermined threshold, the virtual-image creating unit 16B creates a virtual image that masks this region. On the basis of the acquired map-object information, the virtual-image creating unit 16B may determine a position for an image of the map-object information by using the image captured by the image capturing unit 11, and create a virtual image to be displayed (arranged) at this position, the virtual image having a luminance that is equal to or higher than the threshold luminance.

When the virtual-image creating unit 16B refers to the map-object information that has been acquired from the target determining unit 22. If the type of this map-object information is the facility, the virtual-image creating unit 16B refers to the information stored in the link-information storing unit 20, and acquires the symbol corresponding to the name on the signboard. The virtual-image creating unit 16B determines a position corresponding to the image of the map-object information by using the image captured by the image capturing unit 11, and creates the virtual image of the symbol at this position. To the display processing unit 17, the virtual-image creating unit 16B transmits information indicating a masking target position, a masking-use virtual image, information indicating a signboard position and the virtual image of the symbol. The display processing unit 17 displays the masking-use virtual image at the masking target position. The display processing unit 17 displays the virtual image of the symbol at the signboard position.

Figure 7:
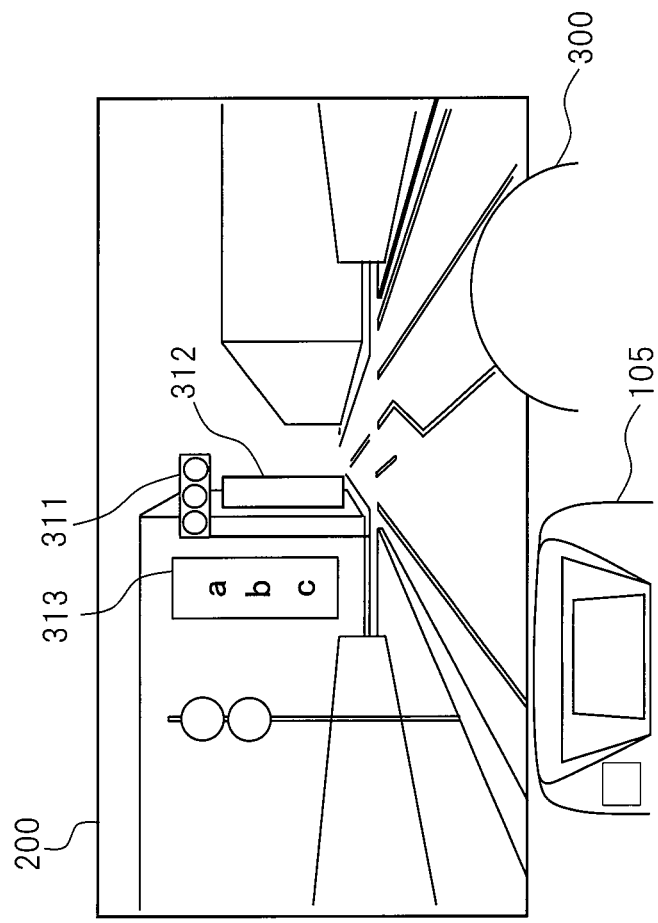
FIG. 7 is a diagram (2) showing exterior circumstances that can be looked at by the driver.

Here, with reference to FIG. 7, the position at which the virtual image is created will be described. FIG. 7 is a diagram showing exterior circumstances that can be looked at by the driver. The driver 300 can look at the exterior circumstances through the display unit 200. Here, it is assumed that there are a traffic signal 311 and a signboard 313 that are the emphasis target objects beyond the line of sight of the driver 300. And, it is assumed that there is a neon signboard 312 having a high luminance. On the basis of the luminance distribution that has been determined by the luminance determining unit 14, the virtual-image creating unit 16B determines a region of the neon signboard 312 as the masking target portion, and creates the masking-use virtual image. Also, it creates a virtual image of the simplified symbol of the signboard 313 of an important facility.

Figure 8:
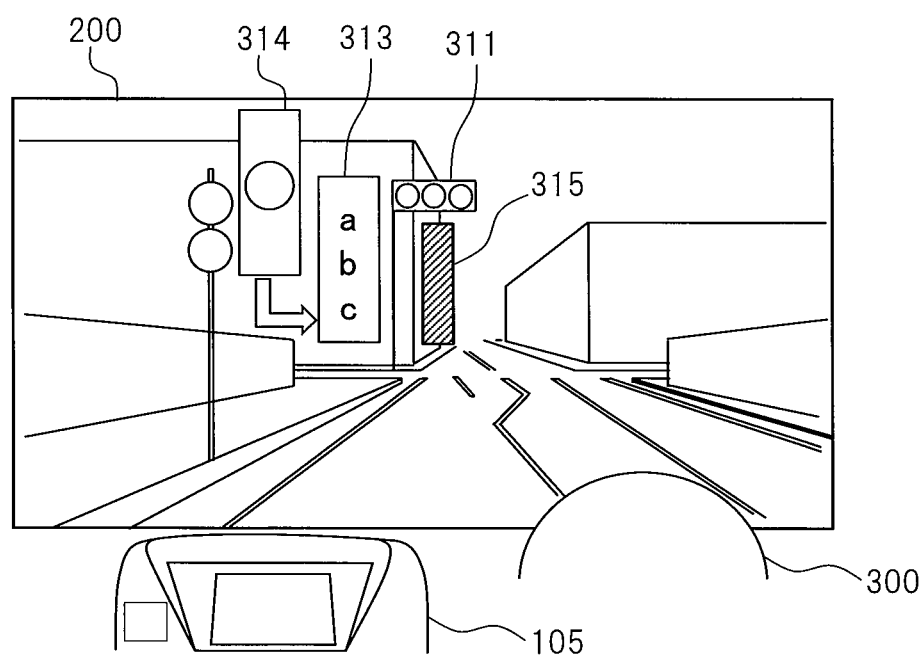
FIG. 8 is a diagram showing a display example of a virtual image.

FIG. 8 is a diagram showing an example of the display of the virtual image. As shown in FIG. 8, the display processing unit 17 displays a masking-use virtual image 315 at a position of the neon signboard 312 of FIG. 7. In this manner, the display system 1 can emphatically display the emphasis target object (such as the traffic signal) by lowering a luminance of unnecessary practical information. The display processing unit 17 displays a virtual image 314 of the symbol at the position of the signboard 313. Even when the letters of the signboard 313 are small and when the number of the letters is large, the signboard can be intuitively recognized by the driver since the letters are changed to the simplified symbol to be displayed. As a result, driver distraction of the driver 300 can be prevented. When a symbol that is easy to be understood by a foreigner is prepared, meaning can be easily understood even by a foreigner driver. In the display system 1B, this manner can be achieved by determining a human race of the driver through user input or others and displaying the symbol corresponding to this human race.

Figure 9:
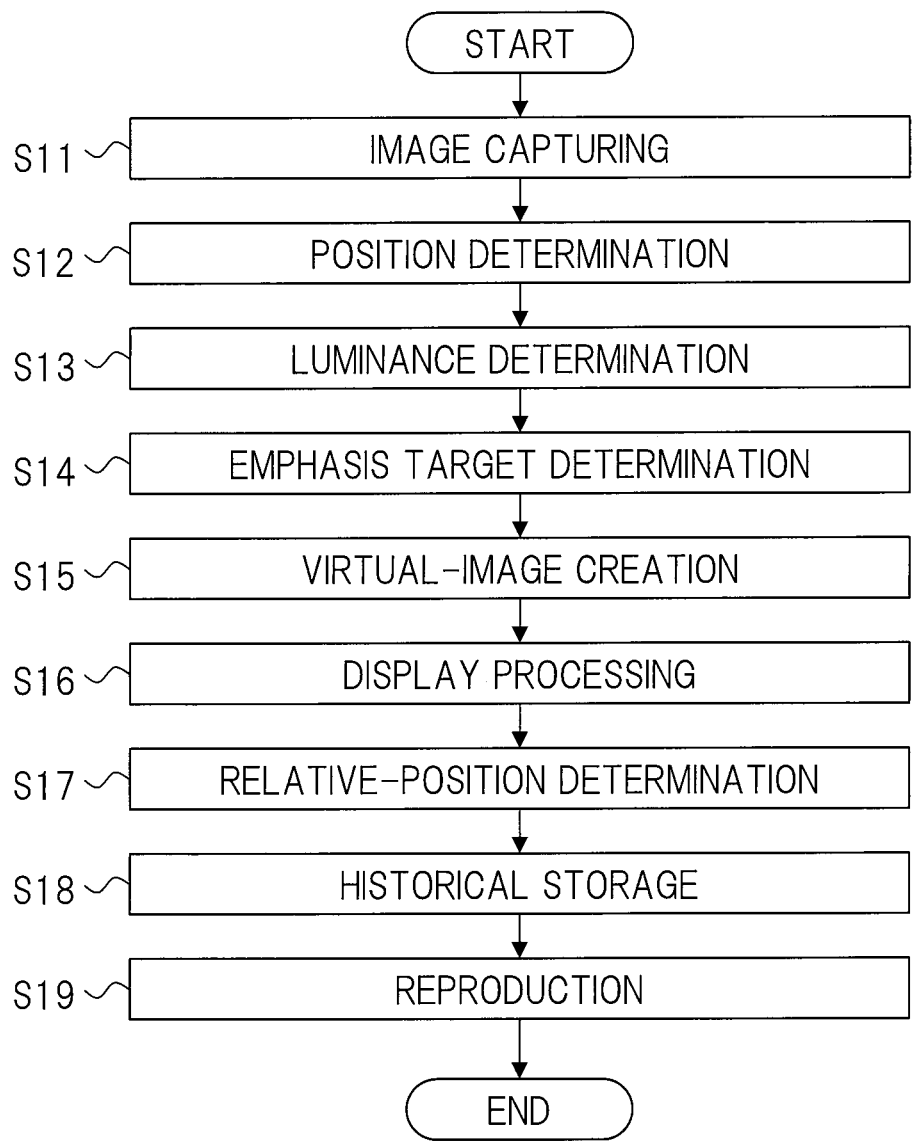
FIG. 9 is a flowchart showing a procedure of determination of an important object and an emphasis display processing for this important object.

Subsequently, with reference to FIG. 9, a procedure of determination of the attentive-look target and the emphasis display processing of this attentive-look target will be described. FIG. 9 is a flowchart showing the procedure of the determination of the attentive-look target and the emphasis display processing of this attentive-look target. Note that a step S11, a step S13 and steps S16 to S19 are the same as the step S1, the step S3 and the steps S6 to S9, respectively, and therefore, the description thereof will be omitted.

The position determining unit 21 determines a position of a subject car (in a step S12). Note that the step S11 and a step S12 may be in reverse order, or may be performed in parallel.

The virtual-image creating unit 16B determines the emphasis target on the basis of the position and a driving direction of the subject car (in a step S14). Subsequently, the virtual-image creating unit 16B determines a portion having a high luminance on the basis of the luminance distribution, and creates the virtual image for use in masking this portion. When the signboard of the facility is the emphasis target, if the simplified symbol corresponding to the letters of this signboard has been prepared, the virtual-image creating unit 16B creates the virtual image of this symbol (in a step S15).

In the above-described working example, note that the case of masking process on the portion having the high luminance has been described. However, a virtual image having a high luminance may be overlapped with the emphasis target portion, and be emphatically displayed. Alternatively, the masking process may be performed together.

In the above-described working example, the case of deletion of the neon signboard 312 by the display of the virtual image for use in the masking has been described. However, when the neon signboard is necessary for arrival to a destination, it is not desirable to perform the masking process on this neon signboard 312. Accordingly, in a relation between the region having the high luminance in the image captured by the image capturing unit 11 and the driving position, when this region having the high luminance corresponds to the destination, cancellation of the masking process is considered.

As a simpler process, even if there is the region having the high luminance, the masking process may be prohibited when the car is near the destination.

Alternatively, information indicating the prohibition of the masking process may be attached to the object information, and then, when an object attached with this information is extracted from the image, this portion may be eliminated from the target for the masking process. In such a configuration, an object having potential needs for the driver 300 can be not masked but presented to the driver 300. Particularly when the signboard of the destination is to be visually checked, this configuration is preferable.

As a modification example of the present working example, the luminance of the region of the neon signboard 312 may be lowered by operation of a liquid crystal shutter provided inside the combiner that is provided between the driver 300 and the windshield glass. In this manner, the visual recognition of the driver 300 can be improved, and safer driving is achieved.

As described above, on the basis of the luminance that has been determined by the luminance determining unit 14, the virtual-image creating unit 16B creates the virtual image for use in emphasizing the emphasis target, and displays this virtual image. Therefore, even when the forward part of the vehicle has the bright state, the driver can easily visually recognize the emphasis target, and safer driving is achieved. That is, the display system 1B can output the virtual image depending on the peripheral circumstances.

Specifically, the virtual-image creating unit 16B creates the virtual image of the position of the emphasis target displayed on the display unit 200, and therefore, the emphasis target portion can be noticeable. When the luminance in periphery of the position of the emphasis target is high, the virtual-image creating unit 16B creates the virtual image that masks a position of this peripheral portion, and therefore, a state in which the emphasis target is difficult to be visually recognized due to the brightness of the peripheral portion of the emphasis target can be eliminated. When the emphasis target is the signboard letters, the virtual-image creating unit 16B creates the virtual image based on the simplified symbol information of these signboard letters stored in the link-information storing unit 20. In this manner, the display system 1B can display the emphasis target having an easily-recognized display mode for the driver 300 (such as an elderly driver or a foreigner driver).

Third Working Example

Figure 10:
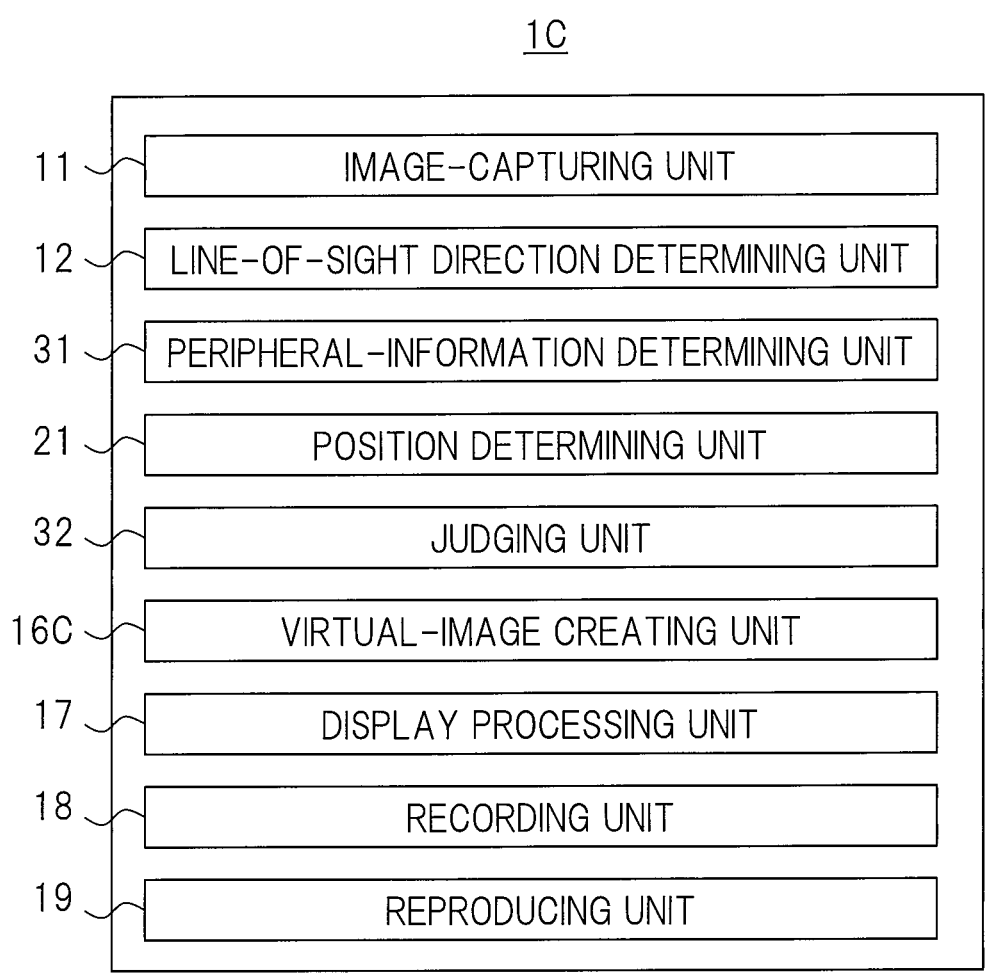
FIG. 10 is a diagram showing an outline of a configuration example of a display system according to a third working example.

FIG. 10 is a diagram showing an outline of a configuration example of a display system 1C according to a third working example. The display system 1C is a system that displays, as a virtual image, information (such as small undulation, and concave and convex) that is difficult be visually recognized by the driver 300.

The display system 1C includes an image capturing unit 11, a line-of-sight direction determining unit 12, a peripheral-information detecting unit 31, a position determining unit 21, a judging unit 32, a virtual-image creating unit 16C, a display processing unit 17, a recording unit 18 and a reproducing unit 19.

The peripheral-information detecting unit 31 is a unit that detects peripheral information indicating an attentive-look object on the forward part of the vehicle. The peripheral-information detecting unit 31 is achieved by the image controlling device 104. Here, the attentive-look object is an object that is considered to be necessarily visually recognized by the driver 300 of the vehicle, and is, for example, a guardrail, a white road line (such as a center line), cliff or others. The peripheral-information detecting unit 31 determines apart having the undulation by using a publicly-known technique using a sensor function or others. The peripheral-information detecting unit 31 detects the peripheral information that is information containing a shape of this undulation and a portion having this undulation. The peripheral-information detecting unit 31 transmits this peripheral information to the judging unit 32.

The peripheral-information detecting unit 31 may detect the peripheral information on the basis of the position that has been determined by the position determining unit 21, the driving direction or others. The peripheral-information detecting unit 31 determine a predetermined forward range in the driving direction on the basis of the position that has been determined by the position determining unit 21 and the driving direction. The peripheral-information detecting unit 31 refers to the previously-stored map information to acquire map information indicating the attentive-look object (in this case, a guardrail and the number of white road lines for vehicles) in this range, so that the peripheral information is detected. The peripheral-information detecting unit 31 transmits this peripheral information to the judging unit 32.

The judging unit 32 is a unit that analyzes an image that has been captured by the image capturing unit 11 and judges whether this image contains an image of the attentive-look object indicated by the peripheral information detected by the peripheral-information detecting unit 31. The judging unit 32 is achieved by the image controlling device 104. The judging unit 32 acquires the exterior circumstantial image that has been captured by the image capturing unit 11. The judging unit 32 acquires the peripheral information from the peripheral-information detecting unit 31.

The judging unit 32 analyzes the image that has been captured by the image capturing unit 11 and judges whether this image contains information corresponding to the peripheral information that has been acquired from the peripheral-information detecting unit 31. That is, the judging unit 32 judges whether the driver 300 can recognize the undulation and the map object on the forward part of the driving. The judging unit 32 previously stores the map object and the undulation image, and judges whether the image that has been acquired from the image capturing unit 11 contains the image indicating the attentive-look object of the peripheral information.

When a result of this judgment shows that the image contains the image of the attentive-look object, the judging unit 32 does not make a request for the creation of the virtual image to the virtual-image creating unit 16C. On the other hand, when the result of this judgment shows that the image does not contain the image of the attentive-look object, the judging unit 32 transmits the information of the attentive-look object, and makes the request for the creation of the virtual image to the virtual-image creating unit 16C.

The virtual-image creating unit 16C is a unit that creates the virtual image based on the peripheral information. When acquiring the peripheral information from the judging unit 32, the virtual-image creating unit 16C creates the virtual image corresponding to this peripheral information at a position indicated by this peripheral information. For example, when the peripheral information is information indicating the guardrail, the virtual-image creating unit 16C creates a virtual image indicating the guardrail. Alternatively, when the peripheral information is information indicating the white line, the virtual-image creating unit 16C creates a virtual image indicating the white line. Note that the virtual-image creating unit 16C may create a virtual image indicating an alert. For example, when the peripheral information is information indicating the cliff, the virtual-image creating unit 16C creates the virtual image indicating the alert that makes the driver pay attention to existence of the cliff.

Subsequently, with reference to FIG. 11, a procedure of a processing that displays the virtual image based on the peripheral information will be described. FIG. 11 is a flowchart showing the procedure of the processing that displays the virtual image based on the peripheral information. Note that a step S21, a step S22 and steps S26 to S29 are the same as the step S1, the step S12 and the steps S6 to S9, respectively, and therefore, the description thereof will be omitted.

Note that the step S21 and the step S22 may be in reverse order, or may be performed in parallel.

In a step S23, the peripheral-information detecting unit 31 detects peripheral information of a forward part of the movable body (in a step S23). Subsequently, the judging unit 32 analyzes the image that has been captured by the image capturing unit 11, and judges whether this image contains the image of the attentive-look object (in a step S24). When the judging unit 32 determines that this image does not contain the image of the attentive-look object, the virtual-image creating unit 16C creates the virtual image based on this peripheral information (in a step S25).

As described above, the display system 1C acquires the peripheral information that has been detected by the peripheral-information detecting unit 31, and judges whether the image that has been captured by the image capturing unit 11 contains the image of the attentive-look object. When a result of this judgment shows that the image does not contain the image of the attentive-look object, the virtual-image creating unit 16C creates the virtual image based on this peripheral information, and displays the virtual image on the display unit 200. According to this, even when the driver 300 cannot visually recognize the guardrail or the centerline (white line) due to snow coverage or others, this manner can make the driver 300 recognize it. That is, the display system 1C can output the virtual image depending on the peripheral circumstances of the vehicle. As a result, the display system 1C can assist the driver 300 to avoid dangerous parts for safety driving.

In the above description, the example of the usage of the head-up display under assumption of the car driving has been described. However, this invention is not limited to this example. For example, under assumption of a state such as sliding down in a ski resort, the invention is also applicable to a case of mounting a see-through head-mounted display on goggles of a sliding person. In this case, the dangerous parts that cannot be found by visual check of the sliding person because of being covered by snow are emphasized as the virtual-image information by a meshed image or others, and are overlapped with the practical information on the display unit of the goggles. In addition, moguls of snow slope that are difficult to be visually found are emphasized as the AR information by a marking image, and are overlapped with practical information on the display unit of the goggles. The above-described manner can make the sliding person recognize and avoid the dangerous parts (moguls).

Note that the invention is not limited to the above-described working examples, and includes various modification examples. For example, each of the above-described working examples has been described in detail for understandably describing the present invention, and is not always limited to the one including all structures explained above. Each of the above-described working examples has been described in the example using the camera and the head-up display (HUD) or the camera and the head mounted display (HMD). However, the present invention is not limited to these examples, and a device having the image capturing unit and the display unit may be used. For example, a personal computer (PC) mounting a smartphone (mobile phone), a table terminal or a Web camera or others can be used. The present invention has been described mainly under assumption of a car as the example of the movable body. However, the present invention is also applicable to a motorbike, a bicycle, a personal vehicle and others.

A part or all of the functions of the present invention or others may be achieved by, for example, hardware acquired by designing of an integrated circuit or others. Alternatively, apart or all of them may be achieved by software acquired by interpreting and executing an operational program that makes a microprocessor or others achieve each function or others. The hardware and the software may be used together.

As control lines and information lines shown in the drawings, the one that is necessary for the explanation is illustrated. All of the control lines and the information lines on a product are not always illustrated. Practically, almost all the configurations may be connected to one another.

As the control lines and the information lines shown in the drawings, the one that is necessary for the explanation is illustrated. All of the control lines and the information lines on a product are not always illustrated. Practically, almost all the configurations may be connected to one another.

EXPLANATION OF REFERENCE CHARACTERS

1A . . . display system, 1B . . . display system, 1C . . . display system, 11 . . . image capturing unit, 12 . . . line-of-sight direction determining unit, 13 . . . user detecting unit, 14 . . . luminance determining unit, 15 . . . luminance changing unit, 16A . . . virtual-image creating unit, 16B . . . virtual-image creating unit, 16C . . . virtual-image creating unit, 17 . . . display processing unit, 18 . . . recording unit, 19 . . . reproducing unit, 20 . . . link-information storing unit, 21 . . . position determining unit, 22 . . . target determining unit, 31 . . . peripheral-information detecting unit, 32 . . . judging unit, 101 . . . head tracking device, 102 . . . exterior-circumstantial-image capturing unit, 103 . . . wearable camera, 104 . . . image controlling device, 105 . . . image displaying device

The invention claimed is:

1. A display system displaying a virtual image on a display unit mounted on a movable body, comprising:
an image capturing unit configured to capture an image of a forward part of the movable body through the display unit;
a processor configured to:
determine a position of the movable body;
determine an emphasis target displayed on the display unit, on the basis of the position;
determine a luminance of the image captured by the image capturing unit; and
create a virtual image having lower luminance than the luminance of a high luminance area and higher luminance than the luminance of an area around the high luminance area, when the processor determines that the luminance of the high luminance area is equal to or higher than a predetermined threshold value; and a display processing unit configured to display the virtual image, created by the processor, around the high luminance area.

2. A display system displaying a virtual image on a display unit mounted on a movable body, comprising:

an image capturing unit configured to capture an image of a forward part of the movable body;

a processor configured to:

determine a position of the movable body;

determine an emphasis target displayed on the display unit, on the basis of the position determined by the processor;

determine a luminance of the image captured by the image capturing unit; and create a virtual image for use in emphasizing the emphasis target determined by the processor, on the basis of the luminance determined by the processor; and a display processing unit configured to display the virtual image, created by the processor, on the display unit, wherein the emphasis target is a signboard displayed on the display unit, the display system further includes a link-information storing unit configured to store link information that links signboard letters that are letters displayed on the signboard to a simplified symbol of the signboard letters, and the processor is configured to refer to the link information stored in the link-information storing unit, and create a virtual image based on the simplified symbol of the signboard letters corresponding to the signboard that becomes the emphasis target.

3. A display system displaying a virtual image on a display unit mounted on a movable body, comprising:

an image capturing unit configured to capture an image of a forward part of the movable body;

a processor configured to:

determine a line-of-sight direction of a user of the display system based on position and direction of the user's head or the user's eyeball;

change a luminance of an area where is determined by the information of the line-of-sight direction and analysis of the image captured by the image capturing unit;

create a virtual image based on the luminance changed by the processor; and determine relative-position information on the basis of an image-capturing direction of the image capturing unit and the line-of-sight direction determined by the processor; and a historical-information storing unit configured to store the image captured by the image capturing unit, the virtual image created by the processor and the relative-position information determined by the processor, as historical information.

4. The display system according to claim 3, wherein the historical-information storing unit separately stores the image captured by the image capturing unit, the virtual image created by the processor and the line-of-sight direction determined by the processor, as the historical information, and further comprising a reproducing unit which synthesizes the virtual image with the image captured by the image capturing unit on the basis of the relative-position information, and reproduces the synthesized image.

5. The display system according to claim 3, further comprising a user-image capturing unit configured to capture an image in the line-of-sight direction, wherein the historical-information storing unit further stores a user image that is an image captured by the user-image capturing unit, and a reproducing unit which reproduces the user image stored by the historical-information storing unit.

6. The display system according to claim 1, wherein the movable body is a vehicle.

* * * * *